US012762140B2

(12) United States Patent
Morrison et al.

(10) Patent No.: US 12,762,140 B2
(45) Date of Patent: Oct. 13, 2026

(54) GENERATING PERIOD-OVER-PERIOD CALCULATIONS USING A CLOUD-BASED DATA WAREHOUSE

(71) Applicant: SIGMA COMPUTING, INC., San Francisco, CA (US)

(72) Inventors: Dillon Morrison, San Francisco, CA (US); Justin Trainor, Berkeley, CA (US); Nipurn Doshi, Pleasanton, CA (US); Sharvil Naik, Union City, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 18/493,578

(22) Filed: Oct. 24, 2023

(65) Prior Publication Data

US 2025/0086192 A1 Mar. 13, 2025

Related U.S. Application Data

(60) Provisional application No. 63/581,478, filed on Sep. 8, 2023.

(51) Int. Cl.
*G06F 16/25* (2019.01)
*G06F 40/18* (2020.01)

(52) U.S. Cl.
CPC ............ *G06F 16/254* (2019.01); *G06F 40/18* (2020.01)

(58) Field of Classification Search
None
See application file for complete search history.

(56) References Cited

U.S. PATENT DOCUMENTS

| | | | | |
|---|---|---|---|---|
| 10,762,581 | B1 * | 9/2020 | Dutt | G06F 16/3329 |
| 2005/0253874 | A1 * | 11/2005 | Lal | G06Q 10/10 345/661 |
| 2009/0282325 | A1 * | 11/2009 | Radakovitz | G06F 40/18 715/217 |
| 2016/0180030 | A1 * | 6/2016 | Gunawardena | G06Q 30/02 705/2 |
| 2018/0157753 | A1 * | 6/2018 | Dougherty | G06F 16/951 |
| 2018/0218051 | A1 * | 8/2018 | Berger | G06F 16/951 |
| 2020/0349156 | A1 | 11/2020 | Frantz et al. | |
| 2022/0335212 | A1 | 10/2022 | Frantz et al. | |

OTHER PUBLICATIONS

European Patent Office, Extended European Search Report (EESR), EP Application No. 24198689.2, dated Feb. 17, 2025, 9 pages.

* cited by examiner

*Primary Examiner* — Kannan Shanmugasundaram

(57) ABSTRACT

Generating period-over-period calculations using a cloud-based data warehouse including receiving, from a client computing system, a request to add a comparison value column to a table, wherein the request comprises an identifier of a date column, an identifier of a base value column, and an identifier of a prior period; matching a first set of dates in the date column to a second set of dates in the date column using the identifier of the prior period; generating a database statement to create the comparison value column, including organizing the comparison value column using values corresponding to the second set of dates in the date column; retrieving the comparison value column from a cloud-based data warehouse using the database statement; and presenting, on the client computing system, the table comprising the comparison value column.

20 Claims, 6 Drawing Sheets

GENERATING PERIOD-OVER-PERIOD CALCULATIONS USING A CLOUD-BASED DATA WAREHOUSE

BACKGROUND

Field of the Invention

The field of the invention is data processing, or, more specifically, methods, apparatus, and products for generating period-over-period calculations using a cloud-based data warehouse.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for generating period-over-period calculations using a cloud-based data warehouse including receiving, from a client computing system, a request to add a comparison value column to a table, wherein the request comprises an identifier of a date column, an identifier of a base value column, and an identifier of a prior period; matching a first set of dates in the date column to a second set of dates in the date column using the identifier of the prior period; generating a database statement to create the comparison value column, including organizing the comparison value column using values corresponding to the second set of dates in the date column; retrieving the comparison value column from a cloud-based data warehouse using the database statement; and presenting, on the client computing system, the table comprising the comparison value column.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
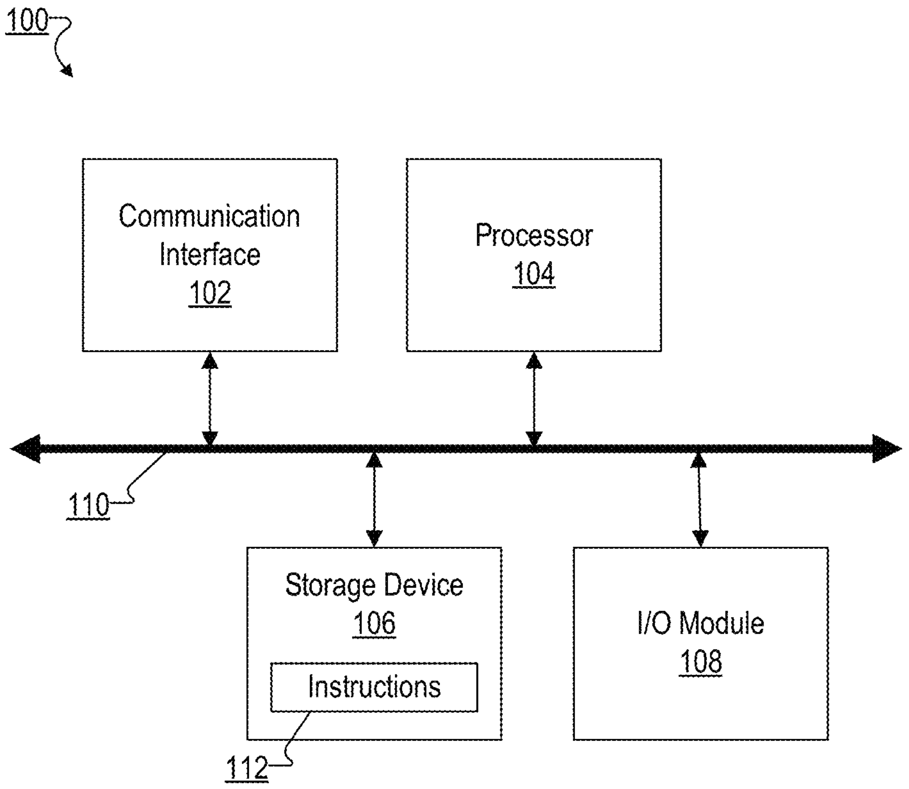
FIG. 1 sets forth a block diagram of an example system configured for generating period-over-period calculations using a cloud-based data warehouse according to embodiments of the present invention.

Example methods, apparatus, and products for generating period-over-period calculations using a cloud-based data warehouse in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
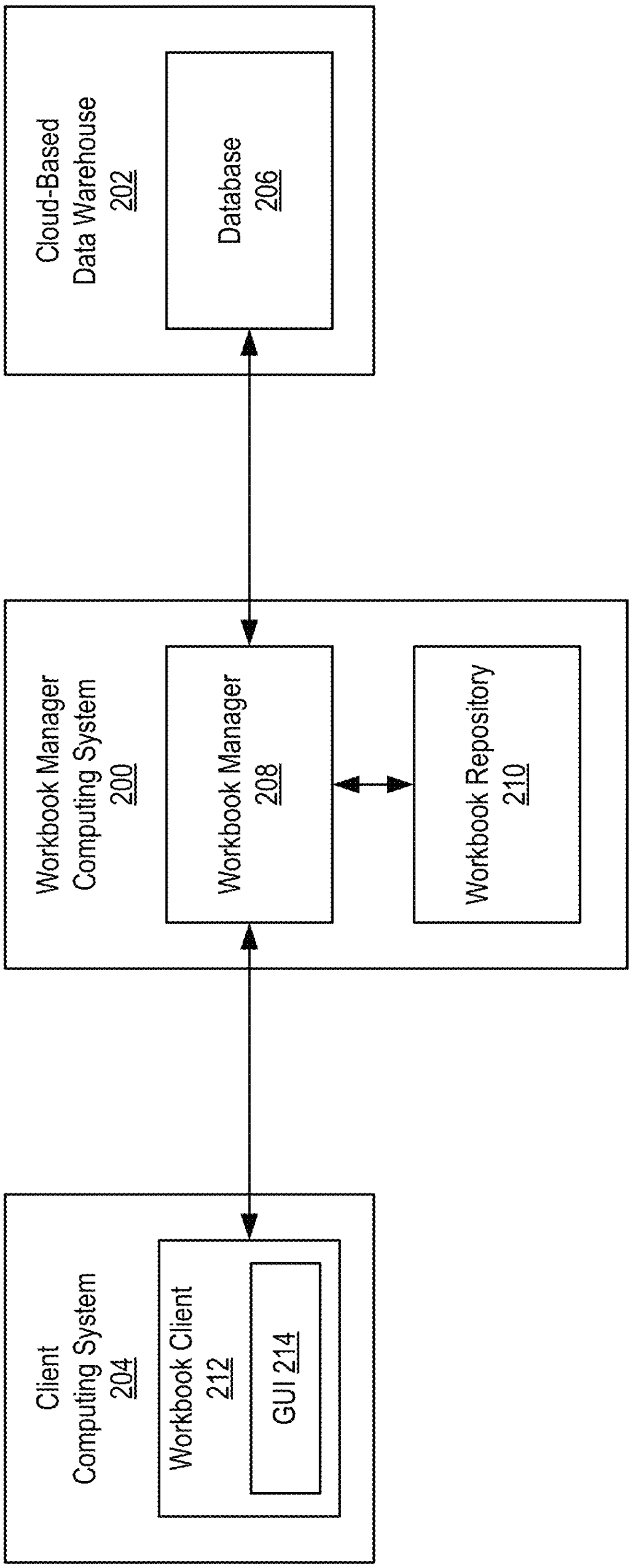
FIG. 2 sets forth a block diagram of an example system configured for generating period-over-period calculations using a cloud-based data warehouse according to embodiments of the present invention.

For further explanation, FIG. 2 illustrates a block diagram depicting an exemplary system for generating period-over-period calculations using a cloud-based data warehouse according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is an organizing mechanism for data and resides on the workbook manager computing system 200. The dataset may also include instructions for the retrieval of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212*a*, 212*b* may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
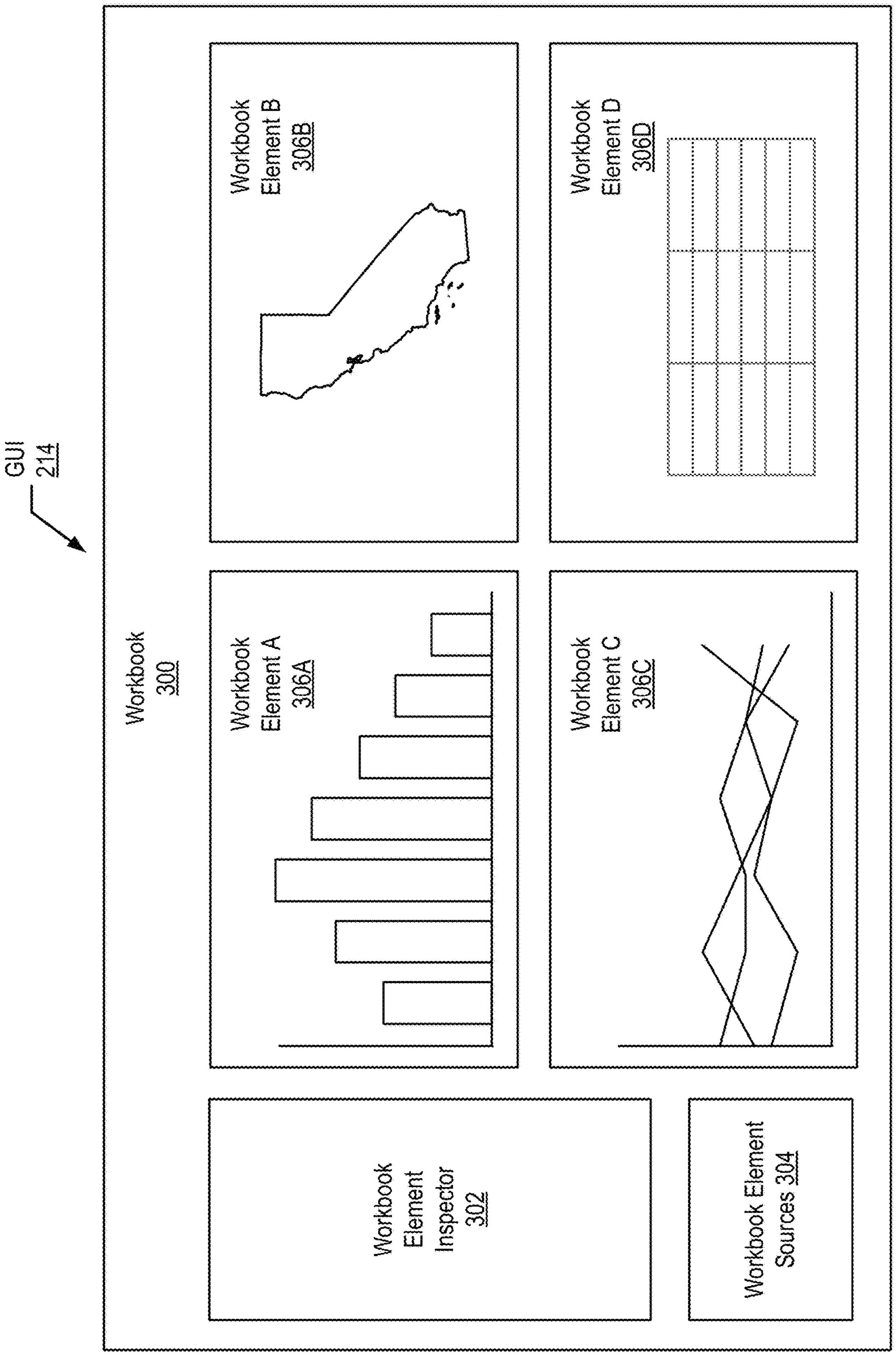
FIG. 3 sets forth an exemplary workbook GUI for generating period-over-period calculations using a cloud-based data warehouse according to embodiments of the present invention.

FIG. 3 shows an exemplary workbook GUI for generating period-over-period calculations using a cloud-based data warehouse according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
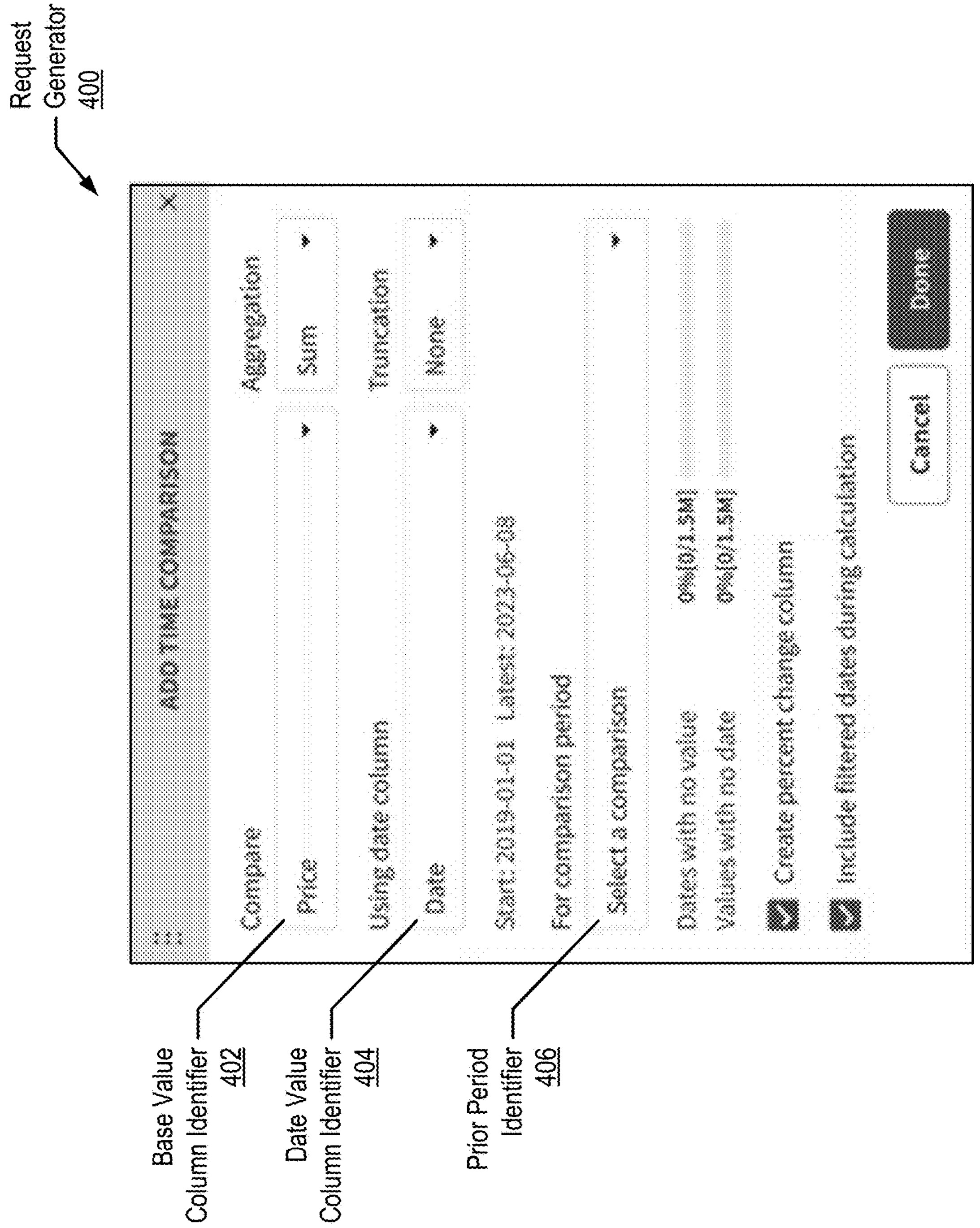
FIG. 4 sets forth an exemplary period-over-period calculation request generator GUI for generating period-over-period calculations using a cloud-based data warehouse according to embodiments of the present invention.

FIG. 4 shows an exemplary period-over-period calculation request generator GUI for generating period-over-period calculations using a cloud-based data warehouse according to embodiments of the present invention. As shown in FIG. 4, the exemplary request generator 400 includes a base value column identifier 402, a data value column identifier 404, and a prior period identifier 406.

A period-over-period calculation is used to compare one set of values to another set of values from a different time period. For example, a period-over-period calculation may be used to compare daily average temperatures for the current summer to daily average temperatures for the previous summer. In the present context, a period-over-period calculation includes the comparison of a base value column to a comparison value column. The base value column includes values corresponding to an initial time period and the comparison value column includes values corresponding to a second time period.

Referring to FIG. 4, the base value column identifier 402 is an identifier of the column containing the values that form the basis for the comparison. The base value column includes the values to which the values in a comparison value column will be compared. The data value column identifier 404 is an identifier of the column containing the dates corresponding to the base values. A date, as used herein, refers to any identification of a point in time (e.g., a specific day, a specific month, a specific year, a specific second, a specific minute, a specific hour, etc.). The prior period identifier 406 is an identifier of one or more dates corresponding to the desired values for use in the comparison value column. The prior period identifier 406 may identify the comparison period (e.g., dates in the year 2017) or may identify an amount of time from which the comparison period may be determined (e.g., three years previous).

The workbook manager 208 may present the request generator 400 in response to an indication by a user of the client computing system 204 that a comparison value column should be generated within a particular table. The workbook manager 208 may evaluate the table to determine the existence of date columns and value columns. In addition, the workbook manager 208 may determine a total time period encompassed by any date columns in order to tailor the selectable prior period to include only available dates.

Figure 5:
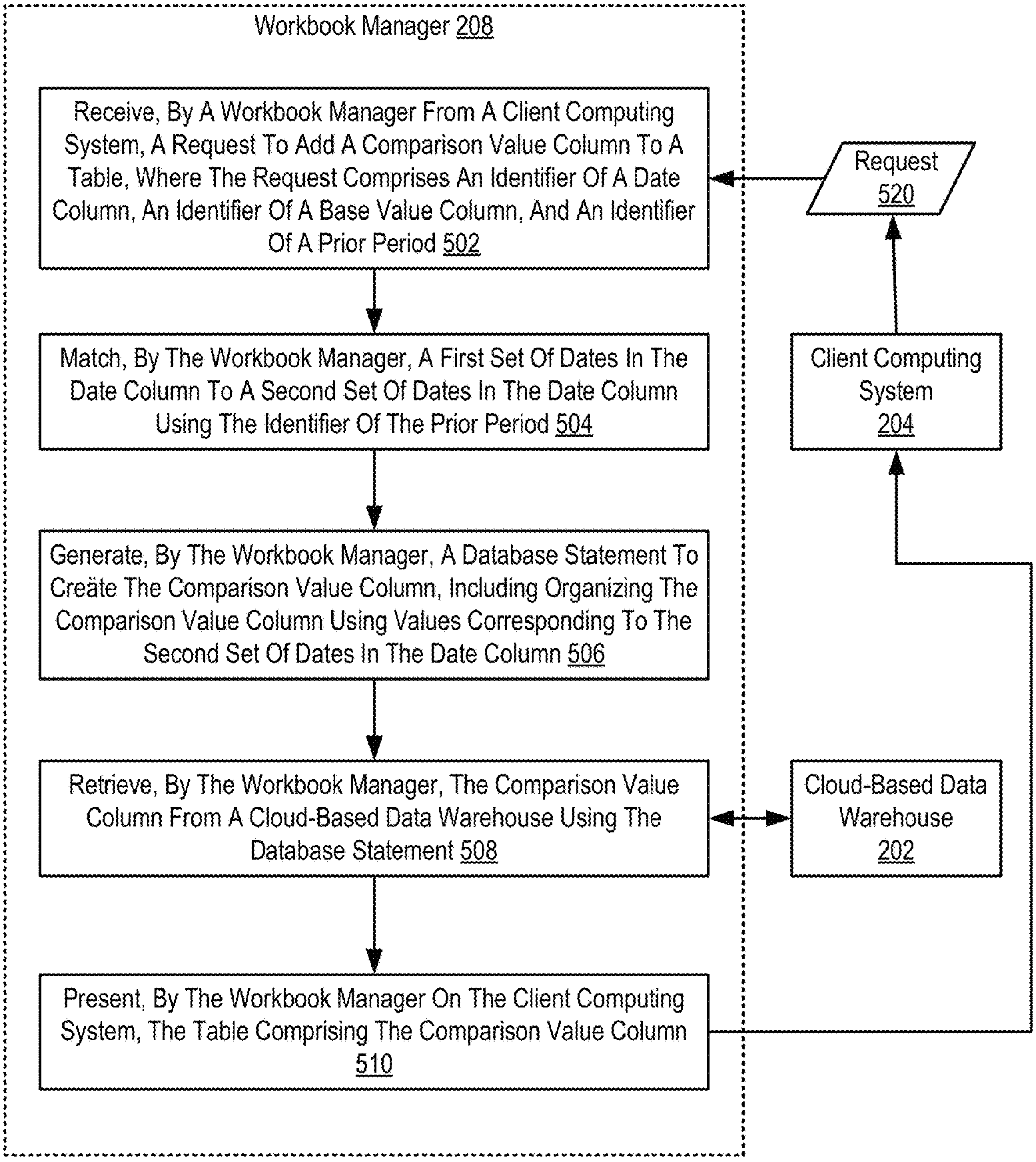
FIG. 5 sets forth a flow chart illustrating an exemplary method for generating period-over-period calculations using a cloud-based data warehouse according to embodiments of the present invention.

For further explanation, FIG. 5 sets forth a flow chart illustrating an exemplary method for generating period-over-period calculations using a cloud-based data warehouse according to embodiments of the present invention. The method of FIG. 5 includes receiving 502, by a workbook manager 208 from a client computing system 204, a request 520 to add a comparison value column to a table, wherein the request 520 comprises an identifier of a date column, an identifier of a base value column, and an identifier of a prior period. Receiving 502, from a client computing system 204, the request 520 to add a comparison value column to a table may be carried out by detecting that a user has manipulated elements of the GUI and/or submitted data using the GUI such that the generation of the request 520 is triggered, and the request 520 is sent to the workbook manager 208. The request 520 may be received in the form of a state specification from the GUI. Specifically, each change to the GUI may result in a new or updated state specification that operates as an instruction to the workbook manager 208. The request 520 may be received via a period-over-period calculation request generator GUI as described with regard to FIG. 4. The request 520 includes an identifier of a date column, an identifier of a base value column, and an identifier of a prior period.

The request 520 may also include an instruction to truncate dates in the date column. The instruction to truncate dates in the date column may instruct the workbook manager to group dates in the date column. Such grouping may be performed to reduce the number of rows in the date column. Specifically, truncating the dates may combine date values according to a broader category of dates (e.g., a group of hours combined into a single day).

The values used in the comparison value column may be retrieved from the same or different table as the table being presented and targeted for adding the comparison value column. Specifically, the values used in the comparison value column may be retrieved from a different portion of the same table or may be retrieved from a different table altogether. For example, one table may include dates for one year and a separate table may include dates for the previous year.

The method of FIG. 5 also includes matching 504, by the workbook manager 208, a first set of dates in the date column to a second set of dates in the date column using the identifier of the prior period. Matching 504 a first set of dates in the date column to a second set of dates in the date column using the identifier of the prior period may be carried out by identifying the first set of dates and the second set of dates in the date column. The first set of dates in the date column represent the portion of the date column corresponding to a starting point within the base value column for initial presentation of the comparison value column. The first set of dates may be directly or indirectly identified based on input from the user of the client computing system 204. Specifically, the first set of dates in the date column may be directly selected by the user of the client computing system 204. Alternatively, the first set of dates in the date column may be the set of rows of the date column currently being displayed to the user of the client computing system 204. Note a "set" of dates may include a single entry in the date column.

Identifying the second set of dates may include calculating the second set of dates from the first set of dates using the identifier of the prior period. Calculating the second set of dates from the first set of dates using the identifier of the prior period may be carried out by calculating the second set of dates by subtracting the length of time described by the identifier of the prior period from the first set of dates. Identifying the second set of dates may further be based on the time period encompassed by each entry in the date column. For example, if each entry in the date column is one month, and the prior period is three years previous, then the first set of dates is matched to the same month in the second set of dates three years prior. As another example, if each entry in the date column is a day, and the prior period is one month previous, then the first set of dates is matched to the same day of the corresponding week in the second set of dates one month prior (e.g., Tuesday of the second week of the month). The particular matching between the first set of dates in the date column to a second set of dates in the date column may be automatic or configured by the user of the client computing system 204. Note that the second set of dates in the date column may be in a separate table.

The table may include null entries. Specifically, one or more entries in the date column may be null and/or one or more entries in the base value column may be null. Entries in the base value column or compare value column corresponding to a null entry may also be made null or a custom value provided by the user of the client computing system 204 may instead be used.

The method of FIG. 5 also includes generating 506, by the workbook manager 208, a database statement to create the comparison value column, including organizing the comparison value column using values corresponding to the second set of dates in the date column. Generating 506 the database statement to create the comparison value column may be carried out by compiling the database statement using the state specification and information gathered about the table and to-be-created comparison value column. This may include lowering the state specification and other information into the various intermediate forms described above.

Organizing the comparison value column using values corresponding to the second set of dates in the date column may be carried out by the workbook manager 208 generating the database statement to create a separate column from the base value column for the compare value column with the values from the entries corresponding to the second set of dates in the date column. Note again that the values for the comparison value column may be from the same column in the same table as the base value column. Alternatively, the values may be from a separate table.

Organizing the comparison value column using values corresponding to the second set of dates in the date column may be carried out by determining an offset based on the matched first set of dates and second set of dates. Using the offset, the workbook manager 208 can generate the database statement to join the base value column to the created comparison value column using the determined offset. The generated database statement may also create a percent change column indicating a difference between entries in the base value column and entries in the comparison value column.

The method of FIG. 5 also includes retrieving 508, by the workbook manager 208, the comparison value column from a cloud-based data warehouse 202 using the database statement. Retrieving 508 the comparison value column from a cloud-based data warehouse 202 using the database statement may be carried out by issuing the database statement to the cloud-based data warehouse and receiving query results comprising the comparison value column from the cloud-based data warehouse. The comparison value column may be received as part of the entire table returned as query results.

The method of FIG. 5 also includes presenting 510, by the workbook manager 208 on the client computing system 204, the table comprising the comparison value column. Presenting 510 the table comprising the comparison value column may be carried out by updating the GUI on the client computing system 204 to display the table and comparison value column. The table and comparison value column may be sent via the workbook client on the client computing system 204.

The above steps improve the operation of the computer system by simplifying the period-over-period calculation process for end users, increasing system utility. The above steps also improve the operation of the computer system by dividing the creation of period-over-period calculations between two separate systems, decreasing cost and processing on the cloud-based data warehouse. This is accomplished by performing initial operations, such as matching sets of dates, on the intermediary workbook manager and using the cloud-based data warehouse to retrieve and generate the period-over-period comparison column.

Figure 6:
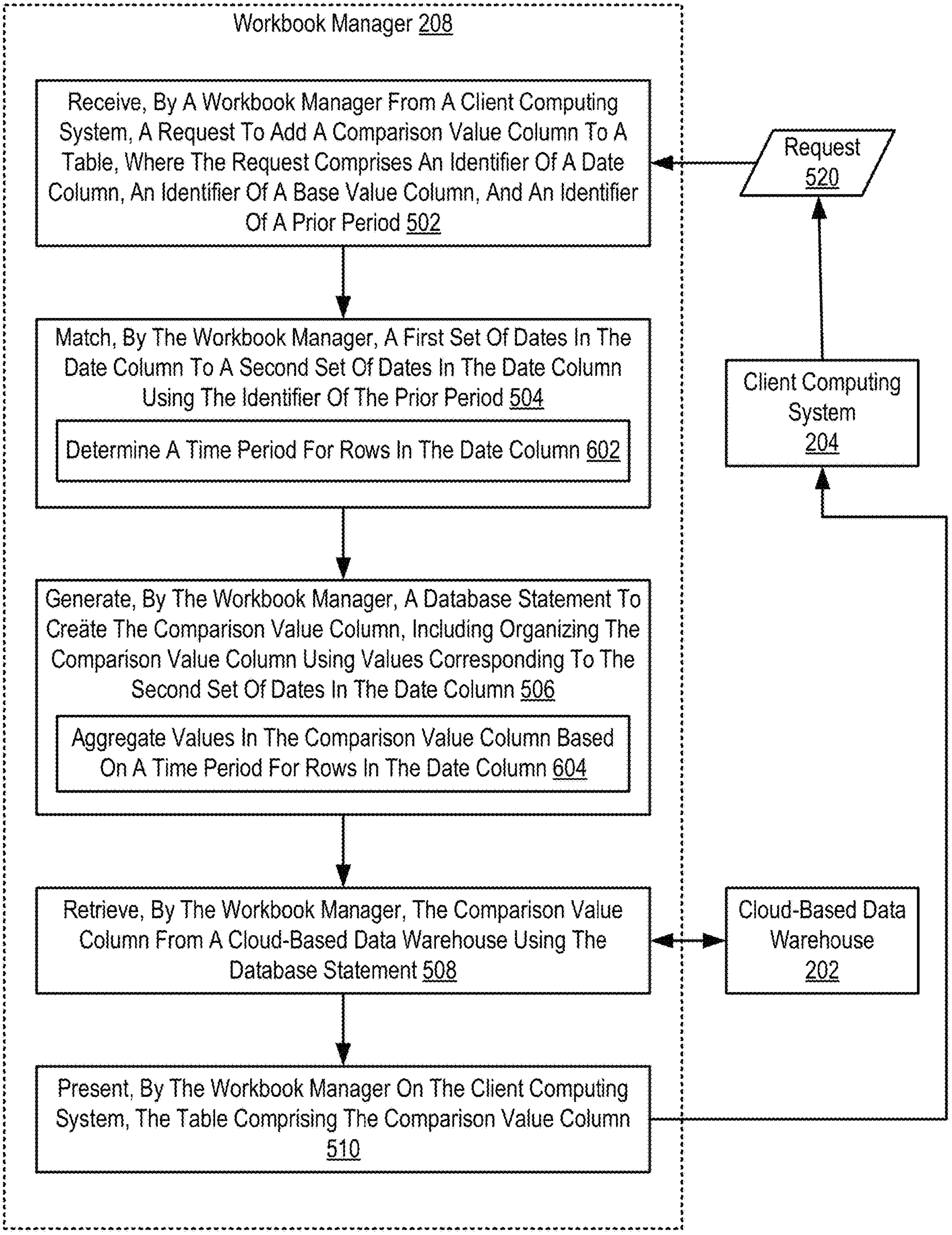
FIG. 6 sets forth a flow chart illustrating an exemplary method for generating period-over-period calculations using a cloud-based data warehouse according to embodiments of the present invention.

For further explanation, FIG. 6 sets forth a flow chart illustrating a further exemplary method for generating period-over-period calculations using a cloud-based data warehouse according to embodiments of the present invention that includes receiving 502, by a workbook manager 208 from a client computing system 204, a request 520 to add a comparison value column to a table, wherein the request 520 comprises an identifier of a date column, an identifier of a base value column, and an identifier of a prior period; matching 504, by the workbook manager 208, a first set of dates in the date column to a second set of dates in the date column using the identifier of the prior period; generating 506, by the workbook manager 208, a database statement to create the comparison value column, including organizing the comparison value column using values corresponding to the second set of dates in the date column; retrieving 508, by the workbook manager 208, the comparison value column from a cloud-based data warehouse 202 using the database statement; and presenting 510, by the workbook manager 208 on the client computing system 204, the table comprising the comparison value column.

The method of FIG. 6 differs from the method of FIG. 5, however, in that matching 504, by the workbook manager 208, a first set of dates in the date column to a second set of dates in the date column using the identifier of the prior period includes determining 602 a time period for rows in the date column. Determining 602 a time period for rows in the date column may be carried out by evaluating the entries in the date column to discover the time period encompassed by each row. For example, the time period may be a second, a minute, an hour, a day, a week, a month, a year, etc.

The determination of the time period for rows in the date column of the table may include the creation of a transformation plan for corresponding values in the comparison value column. Specifically, the workbook manager 208 may determine whether entries in the date column have been aggregated for display on the client computing system 204. For example, a date column with entries corresponding to single days may be aggregated to display rows encompassing one week. The workbook manager 208 may create a transformation plan indicating the transformation from the entries as they exist on the table within the cloud-based data warehouse 202 to the presentation of rows within the table on the workbook displayed on the client computing system 204.

The method of FIG. 6 also differs from the method of FIG. 4, however, in that generating 506, by the workbook manager 208, a database statement to create the comparison value column, including organizing the comparison value column using values corresponding to the second set of dates in the date column includes aggregating 604 values in the comparison value column based on a time period for rows in the date column. Aggregating 604 values in the comparison value column based on a time period for rows in the date column may be carried out by applying the previously generated transformation plan to the entries in the comparison value column. For example, if the date entries have been aggregated from one day to one month, then the entries in the comparison value column may be similarly aggregated to display a comparison value equal to one month of comparison values as stored on the table in the cloud-based data warehouse 202.

In view of the explanations set forth above, readers will recognize that the benefits of generating period-over-period calculations using a cloud-based data warehouse according to embodiments of the present invention include:

- Improving the operation of the computer system by simplifying the period-over-period calculation process for end users, increasing system utility.
- Improving the operation of the computer system by dividing the creation of period-over-period calculations between to separate systems, increasing system robustness.

Exemplary embodiments of the present invention are described largely in the context of a fully functional computer system for generating period-over-period calculations using a cloud-based data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for generating period-over-period calculations using a cloud-based data warehouse, the method comprising:

receiving, by a workbook manager from a client computing system via a graphical user interface, a selection of a date column and a prior period to create a comparison value column for a table in a cloud-based data warehouse, wherein the selection comprises an identifier of the date column and an identifier of the prior period;

matching, by the workbook manager, a first set of dates in the date column to a second set of dates in the date column using the identifier of the date column and the identifier of the prior period, wherein each entry in the first set of dates is matched to a corresponding entry in the second set of dates;

generating, by the workbook manager based on the matching of the first set of dates to the second set of dates, a database statement to create, in the cloud-based data warehouse, the comparison value column as a separate column in the table, including organizing the comparison value column using values corresponding to the second set of dates in the date column;

retrieving, by the workbook manager, the comparison value column from the cloud-based data warehouse, wherein the comparison value column is created in the cloud-based data warehouse by execution of the database statement; and presenting, by the workbook manager on the client computing system, the table comprising the comparison value column, wherein the table includes multiple entries for the prior period that correspond to a time unit smaller than the prior period.

2. The method of claim 1, wherein the selection further comprises a base value column and wherein creating the comparison value column further comprises:

determining an offset based on the matched first set of dates and the second set of dates, and generating the database statement to join the comparison value column to the base value column in the table within a database in the cloud-based data warehouse using the determined offset.

3. The method of claim 1, wherein matching the first set of dates in the date column to the second set of dates in the date column using the identifier of the prior period comprises determining a time period for rows in the date column.

4. The method of claim 1, wherein organizing the comparison value column using values corresponding to the second set of dates in the date column comprises aggregating values in the comparison value column based on a time period for rows in the date column.

5. The method of claim 1, wherein the generated database statement further creates a percent change column indicating a difference between entries in a base value column and entries in the comparison value column.

6. The method of claim 1, wherein the selection comprises an instruction to truncate dates in the date column.

7. The method of claim 1, wherein the table comprises null entries.

8. The method of claim 1, wherein retrieving the comparison value column from the cloud-based data warehouse using the database statement comprises:

issuing the database statement to the cloud-based data warehouse; and receiving query results comprising the comparison value column from the cloud-based data warehouse.

9. The method of claim 1, wherein the database statement is a structured query language statement.

10. The method of claim 1, wherein the workbook manager is on an intermediary computing system between the client computing system and the cloud-based data warehouse.

11. An apparatus for generating period-over-period calculations using a cloud-based data warehouse, the apparatus comprising a computer processor, a computer memory operatively coupled to the computer processor, the computer memory having disposed within it computer program instructions that, when executed by the computer processor, cause the apparatus to carry out steps of:

receiving, by a workbook manager from a client computing system via a graphical user interface, a selection of a date column and a prior period to create a comparison value column for a table in a cloud-based data warehouse, wherein the selection comprises an identifier of the date column and an identifier of the prior period;

matching, by the workbook manager, a first set of dates in the date column to a second set of dates in the date column using the identifier of the date column and the identifier of the prior period, wherein each entry in the first set of dates is matched to a corresponding entry in the second set of dates;

generating, based on the matching of the first set of dates to the second set of dates, a database statement to create, in the cloud-based data warehouse, the comparison value column as a separate column in the table, including organizing the comparison value column using values corresponding to the second set of dates in the date column;

retrieving the comparison value column from the cloud-based data warehouse, wherein the comparison value column is created in the cloud-based data warehouse by execution of the database statement; and presenting, on the client computing system, the table comprising the comparison value column, wherein the table includes multiple entries for the prior period that correspond to a time unit smaller than the prior period.

12. The apparatus of claim 11, wherein the selection further comprises a base value column and wherein creating the comparison value column further comprises:

determining an offset based on the matched first set of dates and the second set of dates, and generating the database statement to join the comparison value column to the base value column in the table within a database in the cloud-based data warehouse using the determined offset.

13. The apparatus of claim 11, wherein matching the first set of dates in the date column to the second set of dates in the date column using the identifier of the prior period comprises determining a time period for rows in the date column.

14. The apparatus of claim 11, wherein organizing the comparison value column using values corresponding to the second set of dates in the date column comprises aggregating values in the comparison value column based on a time period for rows in the date column.

15. The apparatus of claim 11, wherein the generated database statement further creates a percent change column indicating a difference between entries in a base value column and entries in the comparison value column.

16. The apparatus of claim 11, wherein the selection comprises an instruction to truncate dates in the date column.

17. The apparatus of claim 11, wherein the table comprises null entries.

18. The apparatus of claim 11, wherein retrieving the comparison value column from the cloud-based data warehouse using the database statement comprises:

issuing the database statement to the cloud-based data warehouse; and receiving query results comprising the comparison value column from the cloud- based data warehouse.

19. The apparatus of claim 11, wherein the database statement is a structured query language statement.

20. A computer program product for generating period-over- period calculations using a cloud-based data warehouse, the computer program product disposed upon a non-transitory computer readable medium, the computer program product comprising computer program instructions that, when executed, cause a computer to carry out steps of:

receiving, by a workbook manager from a client computing system via a graphical user interface, a selection of a date column and a prior period to create a comparison value column for a table in a cloud-based data warehouse, wherein the selection comprises an identifier of the date column and an identifier of the prior period;

matching, by the workbook manager, a first set of dates in the date column to a second set of dates in the date column using the identifier of the date column and the identifier of the prior period, wherein each entry in the first set of dates is matched to a corresponding entry in the second set of dates;

generating, based on the matching of the first set of dates to the second set of dates, a database statement to create, in the cloud-based data warehouse, the comparison value column as a separate column in the table, including organizing the comparison value column using values corresponding to the second set of dates in the date column;

retrieving the comparison value column from the cloud-based data warehouse, wherein the comparison value column is created in the cloud-based data warehouse by execution of using the database statement; and presenting, on the client computing system, the table comprising the comparison value column, wherein the table includes multiple entries for the prior period that correspond to a time unit smaller than the prior period.

* * * * *